United States Patent [19]

Regan

[11] Patent Number: 5,472,493
[45] Date of Patent: Dec. 5, 1995

[54] SURFACE MODIFIED SILICA

[75] Inventor: David M. Regan, Paris, Ill.

[73] Assignee: Cabot Corporation, Boston, Mass.

[21] Appl. No.: 370,335

[22] Filed: Jan. 9, 1995

Related U.S. Application Data

[63] Continuation of Ser. No. 17,212, Feb. 12, 1993, abandoned.

[51] Int. Cl.[6] ........................................... C04B 14/04
[52] U.S. Cl. ..................... 106/491; 106/481; 106/482; 106/490
[58] Field of Search ............................. 106/481, 482, 106/490, 491

[56] References Cited

U.S. PATENT DOCUMENTS

| | | | |
|---|---|---|---|
| 4,443,357 | 4/1984 | Maloney et al. | 252/321 |
| 4,477,607 | 10/1984 | Litke | 523/212 |
| 4,548,646 | 10/1985 | Mosser et al. | 106/14.12 |
| 4,554,147 | 11/1985 | Stoll et al. | 423/335 |
| 4,650,527 | 3/1987 | Ishii et al. | 148/6.16 |
| 4,677,158 | 6/1987 | Tso et al. | 524/789 |
| 4,769,078 | 9/1988 | Tso | 106/287.25 |
| 4,866,018 | 9/1989 | Elliot | 501/148 |
| 4,874,728 | 11/1989 | Eilliott et al. | 501/148 |
| 5,028,267 | 7/1991 | Lane et al. | 106/287.1 |
| 5,091,451 | 2/1992 | Kahke et al. | 524/124 |
| 5,137,639 | 8/1992 | Guzik et al. | 210/679 |

FOREIGN PATENT DOCUMENTS

| | | |
|---|---|---|
| 0392262 | 10/1990 | European Pat. Off. . |
| 0399442 | 11/1990 | European Pat. Off. . |
| 0224670 | 11/1991 | European Pat. Off. . |
| 0558045 | 1/1993 | European Pat. Off. . |
| 4-037603 | 2/1992 | Japan . |
| 1312665 | 2/1974 | United Kingdom . |

OTHER PUBLICATIONS

Cab–O–Sil (R) Treated Fumed Silica Technical Data Sheets for TS–720, TS–610 and TS–530 (1991). No month.
Cab–O–Sil (R) Fumed Silica Properties and Functions (1987). No month.
Additives for Cab–O–Sil (R) Fumed Silica (1987). No month.
Chemical Abstracts, vol. 117, No. 4, Abstract No. 29896s, "Manufacture of high–purity, monodisperse, hydrophobic, superfine silica powder." Jan. 1992.

Primary Examiner—Mark L. Bell
Assistant Examiner—Scott L. Hertzog

[57] ABSTRACT

A novel and improved surfactant modified silica and method for making the same. The surfactant modified silica is characterized as a fumed silica having a surfactant material treated therewith. Also disclosed is process of thickening aqueous systems which includes the addition of an effective amount of a fumed silica having a surfactant material treated therewith.

12 Claims, No Drawings

5,472,493

SURFACE MODIFIED SILICA

This is a continuation of application Ser. No. 08/017,212 filed on Feb. 12, 1993, abandoned.

BACKGROUND OF THE INVENTION

1. Field of the Invention

The present invention relates to surface modified silicas and in particular, a surfactant modified fumed silica.

2. Description of the Prior Art

Both hydrophilic and hydrophobic fumed silicas are widely used in the coating industry to improve rheology, for flow control and storage stability, as well as serve as an anti-settling agent for pigments and fillers. The production of hydrophilic fumed silica is a well known process. Grades vary in particle and aggregate size. Hydrophobic silica can be produced by treating a fumed silica with a suitable agent which will vary depending on the desired degree of hydrophobicity and other characteristics. Typical treating agents include dimethyldichlorosilane, trimethoxyoctylsilane, hexamethyldi-silazane, and polymethylsiloxane. See, for example, CAB-O-SIL® Treated Fumed Silica Technical Data Sheets for TS-720, TS-610 and TS-530, Cabot Corporation (1991).

In aqueous systems, which include both emulsions and water reducible vehicles, untreated silicas are typically not effective because of the large concentrations of silica that are necessary to realize the desired thickening. However, methods exist for increasing the thickening capability of a given concentration of silica by using certain substances as additives to modify the nature of the system. For example, in systems that are not readily responsive to fumed silica because of inherent chemical properties, the correct additive can often facilitate efficient viscosity and thixotropic control. See, for example, CAB-O-SIL® Fumed Silica Properties and Functions, p.22–27 (1987). See also, Additives for CAB-O-SIL® Fumed Silica, (1987). Such systems teach the separate addition of certain additives to untreated silica dispersions.

As environmental awareness increases, coating manufacturers face increased pressure to replace conventional solvent based systems. As a result, aqueous systems are increasingly used in such applications. While hydrophilic and hydrophobic silicas have both been used in solvent-based coating formulations on a commercial scale, their use in aqueous formulations have been plagued with disadvantages. For example, in aqueous systems, either the silica additive must be increased to unacceptable levels or the formulation does not attain the desired level of performance. A demand therefore exists for aqueous systems which perform comparably to solvent based systems and, accordingly, for improved agents to accomplish such results.

SUMMARY OF THE INVENTION

It is therefore an object of the present invention to provide a novel silica that is a versatile and efficient rheological additive for aqueous coatings and other industrial applications. A further objective is to provide an agent that fosters stability in aqueous compositions. A still further objective is to provide a novel silica which is an effective anti-settling agent.

According to the present invention, a novel and improved silica is disclosed which includes a fumed silica having a surfactant attached thereto. In one embodiment, the silica is typically characterized as having a BET surface area of between about 50 $m^2/g$ and 400 $m^2/g$ and a bulk density of 10 $lbs/ft^3$ or less and the surfactant is selected from the group consisting of nonionic surfactants, cationic surfactants, and amphoteric surfactants.

In a preferred embodiment, for example, the silica has a surface area of 200 $m^2/g$ and is treated with 1% by weight of polyoxyalkylene derivatives of ethylenediamine.

Other details, objects and advantages of the invention and methods for making and using the same will be apparent from the following detailed description.

DETAILED DESCRIPTION OF THE INVENTION

The present invention provides an improved fumed silica having a surfactant attached to its surface which is useful in coating compositions by enhancing rheology control and thixotropy.

Fumed silicas useful in this invention are those commercially available and generally characterized by a chain-like particulate structure having a high surface area per unit weight.

Typically, fumed silica used in accordance with the present invention has the following characteristics:

| | |
|---|---|
| Surface Area ($m^2/g$) | 50–400 |
| Bulk Density (lbs./$ft^3$) | 2.3–10.0 |
| Loss on Ignition (Max % at 1000° C.) | 0.5–2.5 |
| Silica Content (% $SiO_2$ dry basis) | >99.8 |

*Determined from BET surface area assuming a spherical particle.

Determined from BET surface area assuming a spherical particle.

The production of fumed silica is a well-documented process which involves the hydrolysis of silicon tetrachloride vapor in a flame of hydrogen and oxygen. Molten spheres of silica are formed in the combustion process, the diameters of the spheres being varied through process parameters and averaging about 7 to 40 millimicrons. These molten spheres of fumed silica, sometimes referred to as primary particles, fuse with one another to form three dimensional branched, chain-like aggregates of approximately 0.1 to 0.5 micron in length. Cooling takes place very quickly, limiting the growth and ensuring that the fumed silica is amorphous. These aggregates in turn form agglomerates ranging and size from 0.5 to 44 microns (325 Mesh).

In general, the fumed silicas of the present invention will have a surface area between 50 $m^2/g$ and 400 $m^2/g$ (as measured by the nitrogen adsorption method of S. Brunauer, P. H. Emmet and I. Teller, *J. Am. Chemical Society*, vol. 60, page 309 (1938)). Although many commercially available fumed silicas are suitable, a most preferred fumed silica is that available under the name of CAB-O-SIL® and having a surface area of about 200 $m^2/g$. (CAB-O-SIL® is a registered trademark of Cabot Corporation.) Such a silica has been found to be of high quality and readily dispersable.

Typically, the surfactant (also known as a surface active agent) is any water miscible structure containing both polar and non-polar sites. Preferably, the surfactant is an ethoxylated alkyl-phenol; heterocyclic, linear and linear ethoxylated alcohol; alkyl amine/amine salt; ethoxylated amine/amine salt; di-functional block copolymer; tetra-functional block copolymer, including polyether block polymer; sorbitan ester; ethoxylated decyn diol; monomeric and polymeric glycol and derivatives thereof; fatty acid and salts thereof; titanate; phospho-lipid ester; acid functional acrylic; and other equivalent surfactants.

Most preferred are high molecular weight surfactants such as di-functional EO-PO block copolymers (polyoxyalkylene derivatives of propylene glycol); tetra-functional EO-PO block copolymers (polyoxyalkylene derivatives of ethylenediamine); quaternary ammonium salts; polyethoxylated quaternary ammonium salts; ethoxylated linear alcohols; alkyl phenol ethoxylates; primary, secondary and tertiary alkylamines and salt derivatives thereof; alkyl alcohol ethoxylates; and tertiary amines ethoxylates and salt derivatives thereof.

More particularly, quaternary ammonium salts suitable for use in the invention include dialkyl dimethyl ammonium salts represented by the formula:

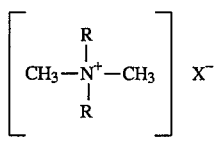

wherein R is an alkyl group containing at least 6 carbon atoms; and X is an ionic species selected from halide, nitrate, carbonate, phosphate, hydroxide, carboxylate, alkyl sulfate, alkyl or aryl sulfonate, phosphate or phosphonate; polyethoxylated quaternary salts include monoalkyl monomethyl ammonium salts represented by the formula:

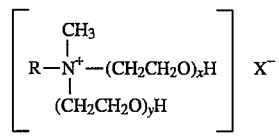

wherein R is an alkyl group containing at least 6 carbon atoms; the average (x+y) is between 2 and 15; and X is an ionic species selected from halide, nitrate, carbonate, phosphate, hydroxide, carboxylate, alkyl sulfate, alkyl or aryl sulfonate, phosphate or phosphonate; amine ethoxylates represented by the formula:

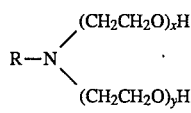

wherein R is an alkyl group containing at least 6 carbon atoms; the average (x+y) is between 2 and 50; amine ethoxylates and salt derivatives represented by the formula:

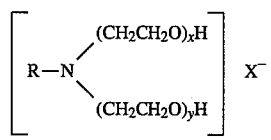

wherein R is an alkyl group containing at least 6 carbon atoms; the average (x+y) is between 2 and 50; and X is an ionic species selected from halide, nitrate, carbonate, phosphate, hydroxide, carboxylate, alkyl sulfate, alkyl or aryl sulfonate, phosphate or phosphonate; alkylamines, such as, monoalkyl, dimethylamines represented by the formula:

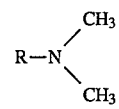

wherein R is an alkyl group containing at least 6 carbon atoms; alkylamine salts including monoalkyl dimethylamine salts represented by the formula:

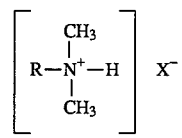

wherein R is an alkyl group containing at least 6 carbon atoms; and X is an ionic species selected from halide, nitrate, carbonate, phosphate, hydroxide, carboxylate, alkyl sulfate, alkyl or aryl sulfonate, phosphate or phosphonate; alkyl phenol ethoxylates represented by the formula:

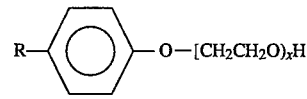

wherein R is $C_4$ to $C_{22}$ alkyl and x is between 1 and 70; and ethoxylated quaternary salts including quaternary diamines represented by the formula:

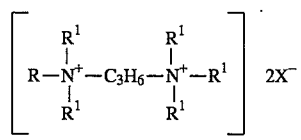

wherein R is an alkyl group containing at least 6 carbon atoms; $R^1$ is an alkyl, hydroxy alkyl or alkoxy alkyl; and X is an ionic species selected from halide, nitrate, carbonate, phosphate, hydroxide, carboxylate, alkyl sulfate, alkyl or aryl sulfonate, phosphate or phosphonate.

Such surfactants are commercially available under various well-known trademarks, such as the PLURONIC® series (BASF Corporation, Parsippany, N.J.), the TETRONIC® series (BASF Corporation, Parsippany, N.J.), the ARQUAD® series (Akzo Chemical Inc., Chicago, Ill.), the TRITON® series (Union Carbide Corp., Danbury, Conn.), the SURFONIC® series (Texaco Chemical Company, Houston, Tex.), the ETHOQUAD® series (Akzo Chemical Inc., Chicago, Ill.), the ARMEEN® series (Akzo Chemical Inc., Chicago, Ill.), the ICONOL® series (BASF Corporation, Parsippany, N.J.), the SURFYNOL® series (Air Products and Chemicals, Inc. Allertown, Pa.), and the ETHOMEEN® series (Akzo Chemical Inc, Chicago, Ill.), to name a few.

Other suitable surfactants for use in the present invention are disclosed in, for example, Kirk-Othmer, *Encyclopedia of Chemical Technology*, 3rd edition, Vol. 22 pages 332–386 and available manufacturing literature, including for example McCutcheon's *Emulsifiers & Detergents, NorthAmerican and International Edition* (McCutcheon Division, The MC Publishing Co., 1991); Ash, *The Condensed Encyclopedia of Surfactants* (Chemical Publishing Co., Inc. 1989); and, Ash, *What Every Chemical Technolo-* gist *Wants to Know About . . . Emulsifiers and Wetting Agents*, Volume I (Chemical Publishing Co., Inc. 1988), all of which are incorporated herein by reference. The surfactants should be adequately stable and inert to environmental conditions prevailing in end product applications incorporating the surfactant modified silica of the present invention.

In general, the amounts of silica to surfactant used in the present invention may vary provided that the amounts are sufficient to modify the properties of the silica to be treated therewith. By modify is meant that the surfactant modified silica will provide enhanced rheological performance and/or chemical stability to a particular aqueous system than that achieved if the silica and surfactant were separately incorporated into the system.

In a preferred embodiment, the silica is treated with an amount of surfactant sufficient to provide a 0.01% to 30% treatment level based on the weight of the unmodified silica. Especially preferred is an amount of surfactant sufficient to produce 0.5% to 10% treatment level based on the weight of the unmodified silica.

In accordance with the present invention, the modification of the silica surface may be accomplished by suitable techniques known to those skilled in the art which will provide distribution of the surfactant on the silica. The mixture is then heated at a temperature and for a period of time sufficient to modify the properties of the silica. Typically, a temperature ranging from about 60° C. to 300° C. for a period ranging from about 15 minutes to about 2 hours has been found suitable. A temperature range from about 80° C. to 240° C. for a time period between 30 and 60 minutes is preferred because such a range has been found to effectively modify the properties of the silica. During the modification, it is theorized that the surfactant will associate with the silica by adsorption or reaction.

A process for modifying the silica with the surfactant includes a batch bulk mixing step followed by a heating cycle similar to that described above.

A preferred method of obtaining uniform surfactant distribution on the silica surface includes pumping the silica from a holding reservoir by known means through a chamber where it is sprayed with surfactant. The surfactant delivery rate can be regulated with a flow meter to achieve the desired level of concentration. This method, having been found to achieve uniform distribution of the surfactant material, is disclosed in further detail in U.S. Pat. No. 5,153,030, the disclosure of which is incorporated herein by reference.

Other ways to enhance above mentioned processes will be appreciated by those skilled in the art and is within the scope of the invention.

The surfactant modified silica of the present invention may be useful in aqueous systems to provide effective rheological control, especially in coating, adhesives, and inks applications.

A non-limiting illustration of the surfactant modified silica of the present invention follows.

EXAMPLE 1

In accordance with the present invention, a suitable cylindrical pressure vessel was equipped with means for addition and removal of heat, temperature recording means, means for introducing the surfactant treating material, means for introducing the fumed silica, and means for the removal and collection of the surfactant modified silica. The vessel was charged at room temperature with 200 grams of CAB-O-SIL® PTG fumed silica. CAB-O-SIL® PTG fumed silica is a pyrogenically produced silica (manufactured and sold by Cabot Corporation) having a BET surface are of about 200 $m^2/g$, a particle size of about 0.014 microns, a density of about 2.5 lbs/ft$^3$, an ignition loss at 1000° C. of about 2% and a pH value of from 3.7 to 4.3. Compressed air was piped through the bottom distributor plate of the vessel to fluidize the silica. Approximately 6 grams of TETRONIC® 701 block polymer (a registered trademark of BASF Corporation, Parsippany, N.J.) was injected into the vessel of fluidized fumed silica. The top of the vessel was attached and the vessel was then allowed to fluidize with $N_2$ for approximately 10 minutes before heating at 230° C. for approximately 30 minutes. The vessel was then placed into a cooling bath for approximately 20 minutes and collected with suitable means. The product was a fumed silica having approximately 3% surfactant by weight treated therewith.

Surfactant modified fumed silica was then dispersed directly into water at 3% silica weight using a commercial Waring Blender controlled by a rheostat. The surfactant modified fumed silica was integrated at low speed and then dispersed at high speed for 5 minutes. Aqueous dispersions were de-aired under vacuum followed by a gentle agitation to reduce foam. Brookfield LVT viscosity measurements were taken at 1, 7 and 28 days using Nos. 2 or 3 spindle at 6 and 60 rpms. For comparative purposes, equivalent ratios of fumed silica and TETRONIC 701 block polymer were separately dispersed ("separate additions") into water at 3% silica weight using a commercial Waring Blender controlled by a rheostat. The silica and surfactant were integrated into the water at low speed and then dispersed at high speed for 5 minutes. The aqueous dispersions was similarly de-aired and gently agitated to reduce foam. Finally, the viscosity of fumed silica in water without any surfactant (referred to as "base silica") was also measured and compared. The aqueous dispersions had the following characteristics.

| | VISCOSITY (centipoise) | | |
|---|---|---|---|
| Time | Base Silica | Separate Addition Silica & Surfactant | Surfactant Modified Silica |
| | Spindle Speed - 6 rpm | | |
| Day 7 | 5 | 1670 | 14,000 |
| Day 14+ | 8 | 3400 | 68,000 |
| | Spindle Speed - 60 rpm | | |
| Day 7 | 6 | 236 | 962 |
| Day 14+ | 7 | 244 | 396 |

As illustrated by Example 1, the surfactant modified silica of the present invention had greater than thickening effect than the conventional addition of silica and surfactant.

EXAMPLE 2

The process of Example 1 was repeated except that 6 grams of TETRONIC® 901 block polymer were injected into the vessel of 200 grams of fluidized fumed silica. The aqueous dispersions had the following characteristics.

| Time | VISCOSITY (centipoise) | | |
|---|---|---|---|
| | Base Silica | Separate Addition Silica & Surfactant | Surfactant Modified Silica |
| Spindle Speed - 6 rpm | | | |
| Day 7 | 5 | + | 10,200 |
| Day 14+ | 8 | + | 4100 |
| Spindle Speed - 60 rpm | | | |
| Day 7 | 6 | + | 748 |
| Day 14+ | 7 | + | 160 |

The plus (+) sign indicates that the dispersion formed by the separate addition of fumed silica and surfactant phase separated into distinct layers of foam, liquid and precipitate.

EXAMPLE 3

The process of Example 1 was repeated except that 6 grams of TETRONIC® 908 block polymer were injected into the vessel of 200 grams of fluidized fumed silica. The aqueous dispersions had the following characteristics.

| Time | VISCOSITY (centipoise) | | |
|---|---|---|---|
| | Base Silica | Separate Addition Silica & Surfactant | Surfactant Modified Silica |
| Spindle Speed - 6 rpm | | | |
| Day 7 | 5 | + | 3320 |
| Day 14+ | 8 | + | 4840 |
| Spindle Speed - 60 rpm | | | |
| Day 7 | 6 | + | 450 |
| Day 14+ | 7 | + | 504 |

EXAMPLE 4

The process of Example 1 was repeated except that 3 grams of PLURONIC® F88 (a registered trademark of BASF Corporation, Parsippany, N.J.) surfactant were injected into the vessel of 200 grams of fluidized fumed silica. The aqueous dispersions had the following characteristics.

| Time | VISCOSITY (centipoise) | | |
|---|---|---|---|
| | Base Silica | Separate Addition Silica & Surfactant | Surfactant Modified Silica |
| Spindle Speed - 6 rpm | | | |
| Day 7 | 5 | + | 4620 |
| Day 14+ | 8 | + | 5560 |
| Spindle Speed - 60 rpm | | | |
| Day 7 | 6 | + | 698 |
| Day 14+ | 7 | + | 720 |

EXAMPLE 5

The process of Example 1 except that 6 grams of PLURONIC® P85 surfactant were injected into the vessel of 200 grams of fluidized fumed silica. The aqueous dispersions had the following characteristics.

| Time | VISCOSITY (centipoise) | | |
|---|---|---|---|
| | Base Silica | Separate Addition Silica & Surfactant | Surfactant Modified Silica |
| Spindle Speed - 6 rpm | | | |
| Day 7 | 5 | + | 1840 |
| Day 14+ | 8 | + | 3400 |
| Spindle Speed - 60 rpm | | | |
| Day 7 | 6 | + | 284 |
| Day 14+ | 7 | + | 394 |

EXAMPLE 6

The process of Example 1 was repeated except that 6 grams of PLURONIC® L31 surfactant were injected into the vessel of grams of fluidized fumed silica. The aqueous dispersions had the following characteristics.

| Time | VISCOSITY (centipoise) | | |
|---|---|---|---|
| | Base Silica | Separate Addition Silica & Surfactant | Surfactant Modified Silica |
| Spindle Speed - 6 rpm | | | |
| Day 7 | 5 | + | 360 |
| Day 14+ | 8 | + | 1030 |
| Spindle Speed - 60 rpm | | | |
| Day 7 | 6 | + | 67 |
| Day 14+ | 7 | + | 155 |

EXAMPLE 7

The process of Example 1 was repeated except that 6 grams of ETHOMEEN S-15 surfactant (Available from Akzo Chemicals, Inc., Chicago, Ill.) were injected into the vessel of 194 grams of fluidized fumed silica. The aqueous dispersions had the following characteristics.

| Time | VISCOSITY (centipoise) | | |
|---|---|---|---|
| | Base Silica | Separate Addition Silica & Surfactant | Surfactant Modified Silica |
| Spindle Speed - 6 rpm | | | |
| Day 7 | 5 | 5240 | 4100 |
| Day 14+ | 8 | 2060 | 17300 |
| Spindle Speed - 60 rpm | | | |
| Day 7 | 6 | 280 | 520 |
| Day 14+ | 7 | 293 | 2400 |

EXAMPLE 8

The process of Example 1 was repeated except that 6 grams of ETHOMEEN S-15 surfactant were injected into the vessel of 194 grams of fluidized fumed silica. The aqueous dispersions had the following characteristics.

| Time | VISCOSITY (centipoise) | | |
|---|---|---|---|
| | Base Silica | Separate Addition Silica & Surfactant | Surfactant Modified Silica |
| Spindle Speed - 6 rpm | | | |
| Day 7 | 5 | + | 16,800 |
| Day 14+ | 8 | + | 11,800 |
| Spindle Speed - 60 rpm | | | |
| Day 7 | 6 | +. | 1100 |
| Day 14+ | 7 | + | 1660 |

EXAMPLE 9

The process of Example 1 was repeated except that 6 grams of ETHOMEEN S-25 surfactant were injected into the vessel of 194 grams of fluidized fumed silica. The aqueous dispersions had the following characteristics.

| Time | VISCOSITY (centipoise) | | |
|---|---|---|---|
| | Base Silica | Separate Addition Silica & Surfactant | Surfactant Modified Silica |
| Spindle Speed - 6 rpm | | | |
| Day 7 | 5 | + | 17,400 |
| Day 14+ | 8 | + | 35,000 |
| Spindle Speed - 60 rpm | | | |
| Day 7 | 6 | + | 1610 |
| Day 14+ | 7 | + | 3110 |

EXAMPLE 10

The process of Example 1 was repeated except that 7.5 grams of ETHOMEEN S-12 salt surfactant (a quaternary derivative of ETHOMEEN S-12, available from Akzo Chemicals, Inc., Chicago, Ill.) were injected into the vessel of 194 grams of fluidized fumed silica. The aqueous dispersions had the following characteristics.

| Time | VISCOSITY (centipoise) | | |
|---|---|---|---|
| | Base Silica | Separate Addition Silica & Surfactant | Surfactant Modified Silica |
| Spindle Speed - 6 rpm | | | |
| Day 7 | 5 | + | 58,700 |
| Day 14+ | 8 | + | 70,300 |
| Spindle Speed - 60 rpm | | | |
| Day 7 | 6 | + | 5450 |
| Day 14+ | 7 | + | 6770 |

EXAMPLE 11

The process of Example 1 was repeated except that 7.5 grams of ETHOMEEN S-15 salt surfactant (a quaternary derivative of ETHOMEEN S-15) were injected into the vessel of 194 grams of fluidized fumed silica. The aqueous dispersions had the following characteristics.

| Time | VISCOSITY (centipoise) | | |
|---|---|---|---|
| | Base Silica | Separate Addition Silica & Surfactant | Surfactant Modified Silica |
| Spindle Speed - 6 rpm | | | |
| Day 7 | 5 | + | 17,100 |
| Day 14+ | 8 | + | 19,200 |
| Spindle Speed - 60 rpm | | | |
| Day 7 | 6 | + | 1850 |
| Day 14+ | 7 | + | 2100 |

EXAMPLE 12

The process of Example 1 except that 7.7 grams of ETHOMEEN S-25 salt surfactant were injected into the vessel of 194 grams of fluidized fumed silica. The aqueous dispersions had the following characteristics.

| Time | VISCOSITY (centipoise) | | |
|---|---|---|---|
| | Base Silica | Separate Addition Silica & Surfactant | Surfactant Modified Silica |
| Spindle Speed - 6 rpm | | | |
| Day 7 | 5 | + | 27,300 |
| Day 14+ | 8 | + | 36,200 |
| Spindle Speed - 60 rpm | | | |
| Day 7 | 6 | + | 2090 |
| Day 14+ | 7 | + | 3040 |

EXAMPLE 13

The process of Example 1 except that 6 grams of TRITON® X-100 surfactant (Available from Union Carbide, Chicago, Ill.) were injected into the vessel of 200 grams of fluidized fumed silica. The aqueous dispersions had the following characteristics.

| Time | VISCOSITY (centipoise) | | |
|---|---|---|---|
| | Base Silica | Separate Addition Silica & Surfactant | Surfactant Modified Silica |
| Spindle Speed - 6 rpm | | | |
| Day 7 | 5 | + | 2780 |
| Day 14+ | 8 | + | 2120 |
| Spindle Speed - 60 rpm | | | |
| Day 7 | 6 | + | 374 |
| Day 14+ | 7 | + | 230 |

EXAMPLE 14

The process of Example 1 was repeated except that 6 grams of TRITON X-45 surfactant were injected into the vessel of 200 grams of fluidized fumed silica. The aqueous dispersions had the following characteristics.

| Time | VISCOSITY (centipoise) | | |
|---|---|---|---|
| | Base Silica | Separate Addition Silica & Surfactant | Surfactant Modified Silica |
| Spindle Speed - 6 rpm | | | |
| Day 7 | 5 | + | 1980 |
| Day 14+ | 8 | + | 5640 |
| Spindle Speed - 60 rpm | | | |
| Day 7 | 6 | + | 286 |
| Day 14+ | 7 | + | 370 |

EXAMPLE 15

The process of Example 1 except that 6 grams of SUR-FONIC® N-100 (a trademark of Texaco Chemical Company, Houston, Tex.) surfactant were injected into the vessel of 200 grams of fluidized fumed silica. The aqueous dispersions had the following characteristics.

| Time | VISCOSITY (centipoise) | | |
|---|---|---|---|
| | Base Silica | Separate Addition Silica & Surfactant | Surfactant Modified Silica |
| Spindle Speed - 6 rpm | | | |
| Day 7 | 5 | + | 13,300 |
| Day 14+ | 8 | + | 3360 |
| Spindle Speed - 60 rpm | | | |
| Day 7 | 6 | + | 1990 |
| Day 14+ | 7 | + | 226 |

EXAMPLE 16

The process of Example 1 except that 7 grams of ARQUAD® HTL8 MS-85 quaternary salt (Available from Akzo Chemicals, Inc., Chicago, Ill.) were injected into the vessel of 200 grams of fluidized fumed silica. The aqueous dispersions had the following characteristics.

| Time | VISCOSITY (centipoise) | | |
|---|---|---|---|
| | Base Silica | Separate Addition Silica & Surfactant | Surfactant Modified Silica |
| Spindle Speed - 6 rpm | | | |
| Day 7 | 5 | 849 | 33,400 |
| Day 14+ | 8 | + | 42,100 |
| Spindle Speed - 60 rpm | | | |
| Day 7 | 6 | 461 | 3820 |
| Day 14+ | 7 | + | 3120 |

EXAMPLE 17

The process of Example 1 except that 10 grams of ARQUAD HTL8 CL-85 quaternary salt were injected into the vessel of 200 grams of fluidized fumed silica. The aqueous dispersions had the following characteristics.

| Time | VISCOSITY (centipoise) | | |
|---|---|---|---|
| | Base Silica | Separate Addition Silica & Surfactant | Surfactant Modified Silica |
| Spindle Speed - 6 rpm | | | |
| Day 7 | 5 | 48 | 18,000 |
| Day 14+ | 8 | 136 | 22,300 |
| Spindle Speed - 60 rpm | | | |
| Day 7 | 6 | 5 | 1400 |
| Day 14+ | 7 | 3 | 1820 |

EXAMPLE 18

The process of Example 1 except that 7 grams of ARQUAD 2T-75 quaternary salt were injected into the vessel of 200 grams of fluidized fumed silica. The aqueous dispersions had the following characteristics.

| Time | VISCOSITY (centipoise) | | |
|---|---|---|---|
| | Base Silica | Separate Addition Silica & Surfactant | Surfactant Modified Silica |
| Spindle Speed - 6 rpm | | | |
| Day 7 | 5 | 3040 | 3100 |
| Day 14+ | 8 | 7040 | 9720 |
| Spindle Speed - 60 rpm | | | |
| Day 7 | 6 | 332 | 850 |
| Day 14+ | 7 | 257 | 986 |

EXAMPLE 19

The process of Example 1 except that 10 grams of ARMEEN® Z (a registered trademark of Akzo Chemicals Inc., Chicago, Ill.) were injected into the vessel of 200 grams of fluidized fumed silica. The aqueous dispersions had the following characteristics.

| Time | VISCOSITY (centipoise) | | |
|---|---|---|---|
| | Base Silica | Separate Addition Silica & Surfactant | Surfactant Modified Silica |
| Spindle Speed - 6 rpm | | | |
| Day 7 | 5 | + | 21,100 |
| Day 14+ | 8 | + | 20,400 |
| Spindle Speed - 60 rpm | | | |
| Day 7 | 6 | + | 1650 |
| Day 14+ | 7 | + | 1670 |

EXAMPLE 20

The process of Example 1 except that 6 grams of ETHO-QUAD® 18/25 quaternary salt (a registered trademark of Akzo Chemicals Inc., Chicago, Ill.) were injected into the vessel of 200 grams of fluidized fumed silica. The aqueous dispersions had the following characteristics.

| | VISCOSITY (centipoise) | | |
|---|---|---|---|
| Time | Base Silica | Separate Addition Silica & Surfactant | Surfactant Modified Silica |
| | Spindle Speed - 6 rpm | | |
| Day 7 | 5 | 295 | 6700 |
| Day 14+ | 8 | 500 | 10,800 |
| | Spindle Speed - 60 rpm | | |
| Day 7 | 6 | 23 | 840 |
| Day 14+ | 7 | 56 | 930 |

EXAMPLE 21

The process of Example 1 except that 6 grams of ETHOQUAD® T/13 quaternary salt were injected into the vessel of 194 grams of fluidized fumed silica. The aqueous dispersions had the following characteristics.

| | VISCOSITY (centipoise) | | |
|---|---|---|---|
| Time | Base Silica | Separate Addition Silica & Surfactant | Surfactant Modified Silica |
| | Spindle Speed - 6 rpm | | |
| Day 7 | 5 | + | 15,400 |
| Day 14+ | 8 | + | 20,600 |
| | Spindle Speed - 60 rpm | | |
| Day 7 | 6 | + | 1600 |
| Day 14+ | 7 | + | 2450 |

EXAMPLE 22

Similar to Example 1, a suitable cylindrical pressure vessel is equipped with means for addition and removal of heat, temperature recording means, means for introducing the surfactant treating material, means for introducing the fumed silica, and means for the removal and collection of the surfactant modified silica. CAB-O-SIL® PTG fumed silica was pumped from a holding reservoir through a chamber where it was sprayed with TETRONIC® 701 block polymer in accordance with the process of U.S. Pat. No. 5,153,030. The delivery rate of the TETRONIC surfactant was regulated with a flow meter to achieve approximately 3% treatment level. After being contacted with the surfactant, the silica flowed into the vessel was then heated at approximately 93° C. for 30 minutes. The vessel was then placed into a cooling bath for approximately 20 minutes and collected with suitable means. The product was a fumed silica having approximately 3% surfactant by weight treated therewith.

Surfactant modified fumed silica was then dispersed directly into water at 3% silica weight using a commercial Waring Blender controlled by a rheostat. The surfactant modified fumed silica was integrated at low speed and then dispersed at high speed for 5 minutes. Aqueous dispersions were de-aired under vacuum followed by a gentle agitation to reduce foam. Brookfield LVT viscosity measurements were taken at day 7 using Nos. 2 or 3 spindle at 6 and 60 rpms. For comparative purposes, equivalent ratios of fumed silica and TETRONIC 701 block polymer were separately dispersed ("separate additions") into water at 3% silica weight using a commercial Waring Blender controlled by a rheostat. The silica and surfactant were integrated into the water at low speed and then dispersed at high speed for 5 minutes. The aqueous dispersions was similarly de-aired and gently agitated to reduce foam. As in the previous examples, the viscosity of base silica in water was also measured. The aqueous dispersions had the following characteristics.

| | VISCOSITY (centipoise) | | |
|---|---|---|---|
| Time | Base Silica | Separate Addition Silica & Surfactant | Surfactant Modified Silica |
| | Spindle Speed - 6 rpm | | |
| Day 7 | 5 | 1670 | 3470 |
| | Spindle Speed - 60 rpm | | |
| Day 7 | 6 | 236 | 331 |

EXAMPLE 23

The process of Example 22 was repeated except that TETRONIC® 901 block polymer was sprayed in accordance with the process of U.S. Pat. No. 5,153,030. The delivery rate of the TETRONIC surfactant was again regulated with a flow meter to achieve approximately 3% treatment level. The aqueous dispersions had the following characteristics.

| | VISCOSITY (centipoise) | | |
|---|---|---|---|
| Time | Base Silica | Separate Addition Silica & Surfactant | Surfactant Modified Silica |
| | Spindle Speed - 6 rpm | | |
| Day 7 | 5 | + | 3280 |
| | Spindle Speed - 60 rpm | | |
| Day 7 | 6 | + | 316 |

As illustrated by the above examples, the surfactant modified silica of the present invention had greater thickening effect than the conventional addition of silica and surfactant. Furthermore, some of the cationic and nonionic surfactant treated silica provided three to five orders of magnitude greater thickening than untreated base silica. In addition, dispersion stability was provided in aqueous systems employing the surfactant modified silica of the present invention, whereas the conventional addition of silica and surfactant resulted in, for many of the examples, immediate phase separation. The present invention provides a versatile and efficient rheological additive for aqueous coatings and other industrial applications.

It is understood that the present invention is not limited to the particular embodiments shown and described herein, but that various changes and modifications may be made without departing from the scope and spirit of the invention.

What is claimed is:

1. A surface modified silica for use in aqueous based systems comprising fumed silica having between 0.5% to about 10% by weight of a material selected from the group consisting of di-functional EO-PO block copolymers; tetra-functional EO-PO block copolymers; quaternary ammonium salts; ethoxylated quaternary ammonium salts; tertiary alkylamines and salt derivatives thereof; or amine ethoxylates and salt derivatives thereof, treated therewith.

2. The surfactant modified silica according to claim 1 wherein said silica is a fumed silica having a BET surface area of between about 50 m²/g and 400 m²/g and a bulk density of 10 lbs/ft³ or less.

3. The surface modified silica according to claim 1 wherein said quaternary ammonium salt is a dialkyl dimethyl ammonium salt represented by the formula:

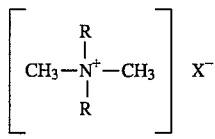

wherein R is an alkyl group containing at least 6 carbon atoms and X is an ionic species selected from halide, nitrate, carbonate, phosphate, hydroxide, carboxylate, alkyl sulfate, alkyl or aryl sulfonate, phosphate or phosphonate.

4. The surface modified silica according to claim 1 wherein said ethoxylated quaternary ammonium salt is a monoalkyl monomethyl diethoxylated ammonium salt represented by the formula:

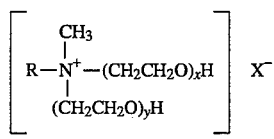

wherein R is an alkyl group containing at least 6 carbon atoms; the average (x+y) is between 2 and 15; and X is an ionic species selected from halide, nitrate, carbonate, phosphate, hydroxide, carboxylate, alkyl sulfate, alkyl or aryl sulfonate, phosphate or phosphonate.

5. The surface modified silica according to claim 1 wherein said amine ethoxylates are represented by the formula:

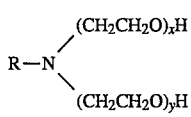

wherein R is an alkyl group containing at least 6 carbon atoms and the average (x+y) is between 2 and 50.

6. The surface modified silica according to claim 1 wherein said amine ethoxylates are salt derivatives represented by the formula:

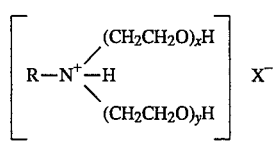

wherein R is an alkyl group containing at least 6 carbon atoms; the average (x+y) is between 2 and 50; and X is an ionic species selected from halide, nitrate, carbonate, phosphate, hydroxide, carboxylate, alkyl sulfate, alkyl or aryl sulfonate, phosphate or phosphonate.

7. The surface modified silica according to claim 1 wherein said tertiary alkylamines are monoalkyl, dimethylamines represented by the formula:

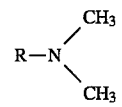

wherein R is an alkyl group containing at least 6 carbon atoms.

8. The surface modified silica according to claim 1 wherein said tertiary alkylamine salts are monoalkyl dimethylamine salts represented by the formula:

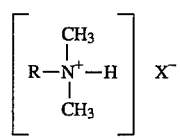

wherein R is an alkyl group containing 6 carbon atoms; and X is an ionic species selected from halide, nitrate, carbonate, phosphate, hydroxide, carboxylate, alkyl sulfate, alkyl or aryl sulfonate, phosphate or phosphonate.

9. The surface modified silica according to claim 1 wherein said ethoxylated quaternary ammonium salt is a diquaternary diamine represented by the formula:

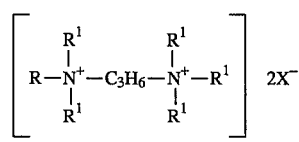

wherein R is an alkyl group containing at least 6 carbon atoms; $R^1$ is alkyl, hydroxyl alkyl or alkoxy alkyl; and X is an ionic species selected from halide, nitrate, carbonate, phosphate, hydroxide, carboxylate, alkyl sulfate, alkyl or aryl sulfonate, phosphate or phosphonate.

10. The surface modified silica according to claim 1 wherein said treating is a heat treatment.

11. A process for thickening aqueous systems comprising adding thereto a thickening effective amount of fumed silica having been treated with between 0.5% to about 10% by weight of a material selected from the group consisting of di-functional EO-PO block copolymers; tetra-functional EO-PO block copolymers; quaternary ammonium salts; ethoxylated quaternary ammonium salts; tertiary alkylamines and salt derivatives thereof; or amine ethoxylates and salt derivatives thereof.

12. The process according to claim 11 wherein said fumed silica has a BET surface area of between about 50 m²/g and 400 m²/g and a bulk density of 10 lbs/ft³ or less.

* * * * *